US009369674B2

(12) United States Patent
Huang

(10) Patent No.: US 9,369,674 B2
(45) Date of Patent: Jun. 14, 2016

(54) DIALING DEVICE AND METHOD FOR VIDEO CONFERENCING

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Hung-Chi Huang, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/835,186

(22) Filed: Aug. 25, 2015

(65) Prior Publication Data

US 2016/0127689 A1 May 5, 2016

(30) Foreign Application Priority Data

Nov. 3, 2014 (TW) .............................. 103138116 A

(51) Int. Cl.
*H04N 7/14* (2006.01)
*H04N 7/15* (2006.01)
*H04L 29/06* (2006.01)

(52) U.S. Cl.
CPC ............ *H04N 7/155* (2013.01); *H04L 65/1046* (2013.01); *H04L 65/1069* (2013.01); *H04L 65/403* (2013.01); *H04N 7/157* (2013.01)

(58) Field of Classification Search
CPC ....................................................... H04N 7/14
USPC ...................... 348/14.01, 14.03, 14.08, 14.11
See application file for complete search history.

(56) References Cited

U.S. PATENT DOCUMENTS

| 2010/0211911 | A1* | 8/2010 | Logan | G06Q 10/109 715/808 |
| 2012/0269334 | A1* | 10/2012 | Goguen | H04M 3/565 379/202.01 |
| 2014/0177815 | A1* | 6/2014 | Bhow | H04L 12/1818 379/202.01 |
| 2015/0067044 | A1* | 3/2015 | Bakaev | H04L 65/403 709/204 |
| 2015/0378531 | A1* | 12/2015 | Bansal | G06F 3/0482 348/14.03 |

* cited by examiner

*Primary Examiner* — Olisa Anwah
(74) *Attorney, Agent, or Firm* — Novak Druce Connolly Bove + Quigg LLP

(57) ABSTRACT

A dialing method for video conferencing including acquiring identification information of a user when the user requests to log in a web portal of a video conferencing management system, verifying whether the acquired identification information indicates that the user is a validated user according to the second relationship table, determining a corresponding authority level of the user according to the second relationship table, determining a number of dialing numbers corresponding to the authority level of the user when the user is verified as the validated user, selecting one dialing number from the number of dialing numbers in response to a selection of the user, and connecting an electronic device of the user to a corresponding virtual conference room of the video conferencing management system according to the selected dialing number.

15 Claims, 5 Drawing Sheets

| Authority level | Conference type | Time information | Dialing number |
|---|---|---|---|
| High authority level | XXX | XXX | XXX |
| Middle authority level | Customer service | 2014/10/20, 8:00-9:00 | 1006 |
| | | 2014/10/20, 9:00-10:00 | 1007 |
| | | 2014/10/20, 14:00-15:00 | 1008 |
| | | 2014/10/20, 15:00-16:00 | 1009 |
| | | 2014/10/20, 16:00-17:00 | 1010 |
| | Teaching | XXX | XXX |
| | Symposium | XXX | XXX |
| Low authority level | XXX | XXX | XXX |

FIG. 3C

DIALING DEVICE AND METHOD FOR VIDEO CONFERENCING

CROSS-REFERENCE TO RELATED APPLICATIONS

This application claims priority to Taiwanese Patent Application No. 103138116 filed on Nov. 3, 2014, the contents of which are incorporated by reference herein.

FIELD

The subject matter herein generally relates to video conferencing technology, and particularly to a dialing device and a method for video conferencing.

BACKGROUND

As employees and individuals wish to be able to see a person over long distances, a remote video conference system has been established. When establishing the remote video conference among a number of parties, an initiator uses a specific video device or other system devices to dial other parties to establish the remote video conference. These systems may require advanced set up or dedicated systems and/ or networks.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

FIGS. 3A-3C illustrate three first relationship tables of different embodiments.

DETAILED DESCRIPTION

Figure 1:
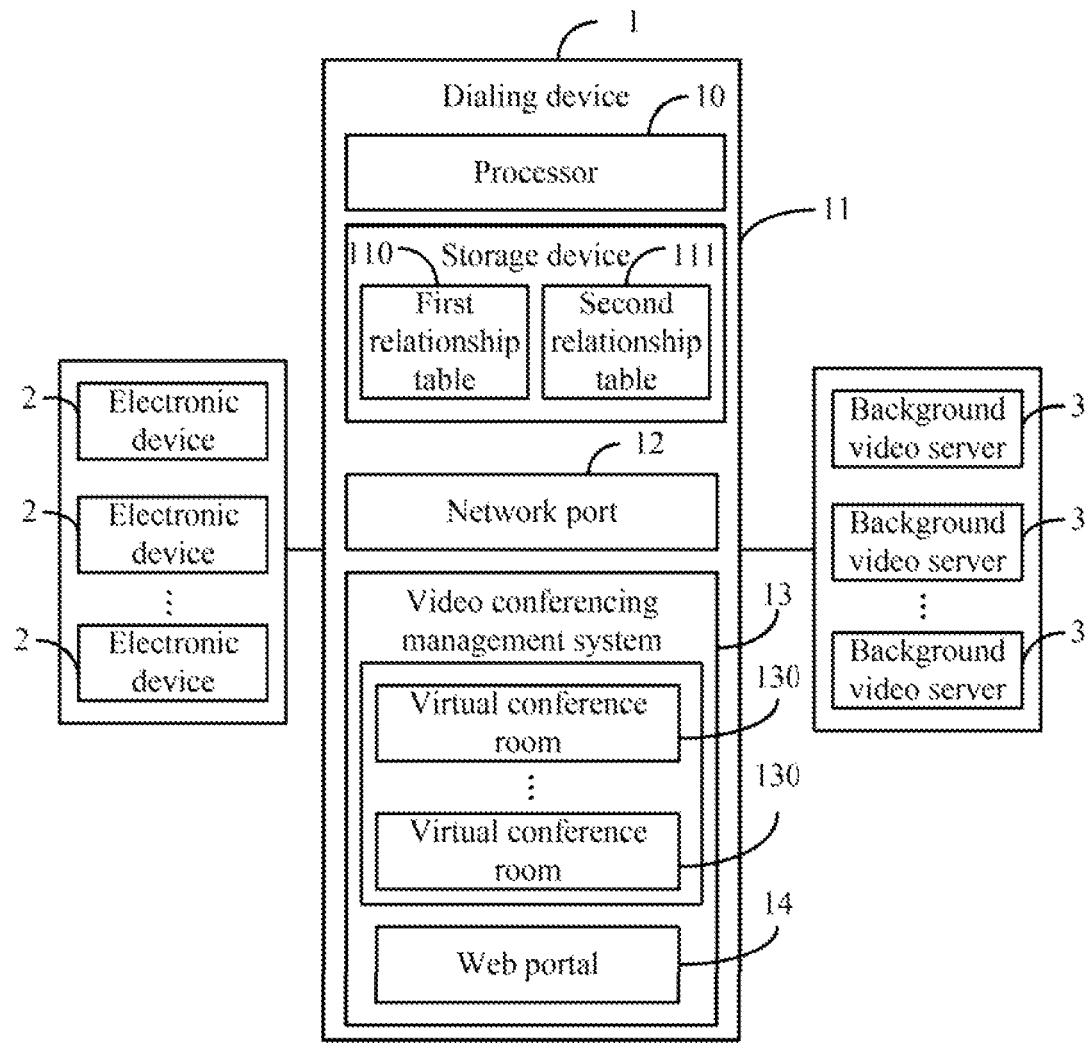
FIG. 1 is a block diagram of a dialing device for video conferencing of one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

The term "comprising" means "including, but not necessarily limited to"; it specifically indicates open-ended inclusion or membership in a so-described combination, group, series and the like.

FIG. 1 illustrates a block diagram of a dialing device 1 for video conferencing. The dialing device 1 includes, but is not limited to, a processor 10, a storage device 11, and a network port 12. In at least one embodiment, the dialing device 1 can be a server, a workstation, or other suitable electronic devices. FIG. 1 illustrates only one example of the dialing device 1 that can include more or fewer components than illustrated, or have a different configuration of the various components in other embodiments.

A video conferencing management system 13 runs on the dialing device 1, and the video conferencing management system 13 provides a web portal 14 and a number of virtual conference rooms 130, users can dial in one corresponding virtual conference room 130 of the video conferencing management system 13 via the web portal 14. In at least one embodiment, the video conferencing management system 13 can be a conference management software.

The dialing device 1 is connected to a number of electronic devices 2 after the users of the number of electronic devices 2 dial in one corresponding virtual conference room 130 of the video conferencing management system 13 via the web portal 14. In at least one embodiment, the electronic devices 2 can be personal computers, smart phones, or other suitable electronic devices. The network port 12 is used for connecting the dialing device 1 with the number of electronic devices 2 via Internet or Local Area Network (LAN).

Figure 3A:
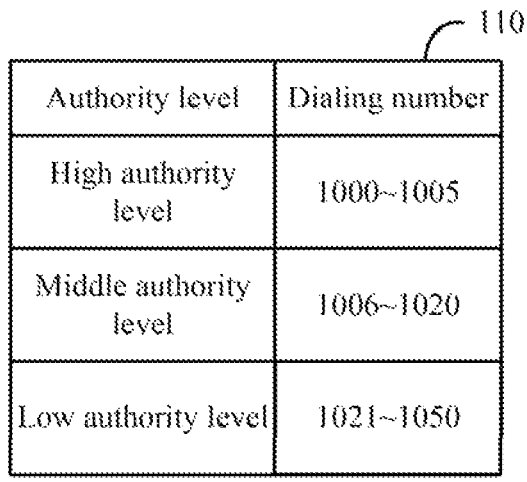

The storage device 11 stores a first relation table 110 and a second relationship table 111. FIG. 3A illustrates the first relationship chart 110 of one embodiment, the first relationship table 110 records relationships between a number of authority levels and a number of dialing numbers. In at least one embodiment, the authority levels of the users can include a high authority level, a middle authority level, and a low authority level. For example, the users who pay an annual fee have the high authority level, the users who pay a monthly fee have the middle authority level, and the users who do not pay any fee have the low authority level. Each dialing number corresponds to one of the virtual conference rooms 130, the users can join in the virtual conference room 130 by dialing the corresponding dialing number. The second relationship table 111 records identification information and corresponding authority level of each user permitted to log in the web portal 14.

In at least one embodiment, each virtual conference room 130 can have a adjustable capacity. Thus, each virtual conference room 130 can accommodate different number of users joining in the virtual conference room 130. The capacity of the virtual conference rooms 130 relates to the authority level of an initiator who is a first user joining in the virtual conference rooms 130, and the initiator is the user who establishes the video conference. For example, the higher the authority level of the initiator is, the larger capacity is assigned to the virtual conference room 130 by the dialing device 1. By contrast, the lower the authority level of the initiator is, the smaller capacity is assigned to the virtual conference room 130. In other embodiments, each virtual conference room 130 can also have the constant capacity.

In at least one embodiment, the storage device 11 can include various types of non-transitory computer-readable storage mediums. For example, the storage device 11 can be an internal storage system, such as a flash memory, a random access memory (RAM) for temporary storage of information, and/or a read-only memory (ROM) for permanent storage of information. The storage device 11 can also be an external storage system, such as a hard disk, a storage card, or a data storage medium. The at least one processor 10 can be a central processing unit (CPU), a microprocessor, or other data processor chip that performs functions of the dialing device 1.

In at least one embodiment, the storage device 11 stores one or more programs, when the one or more programs are executed by the at least one processor 10, the one or more programs cause the at least one processor 10 to implement corresponding functions.

Figure 2:
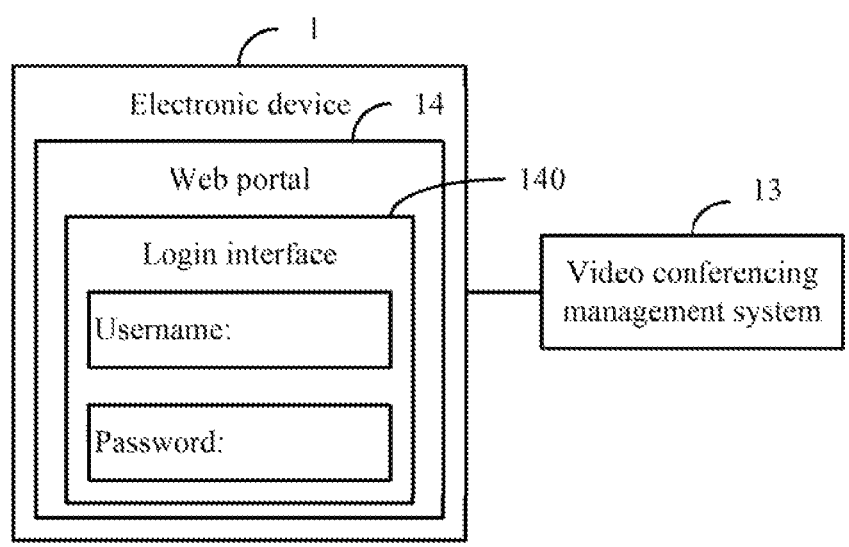
FIG. 2 is a schematic diagram of a web portal of a video conferencing management system of one embodiment.

The processor 10 acquires the identification information of the user when the user requests to log in the web portal 14, and verifies whether the acquired identification information indicates that the user is a validated user according to the second relationship table 111. FIG. 2 illustrates a schematic diagram of the web portal 14, the processor 10 provides the web portal 14 to the electronic device 2 of the user, the web portal 14 includes, but is not limited to, a login interface 140. When the user requests to log in the web portal 14, the user can input the identification information via the login interface 140. The processor 10 determines whether the user is a validated user which is permitted to dial in the video conferencing management system 13 by verifying the identification information input by the user on the login interface 140. In at least one embodiment, the identification information can include a username and a password of the user, in other embodiments, the identification information also can include a username and a fingerprint information of the user.

In at least one embodiment, the second relationship table 111 records identification information of each user permitted to log in the web portal 14, the processor 10 determines whether the identification information of the user is recorded in the second relationship table 111, if the identification information of the user is recorded in the second relationship table 111, the processor 10 determines the user as the validated user, if the identification information of the user is not recorded in the second relationship table 111, the processor 10 determines the user is an invalided user and does not permit the user to log in the web portal 14.

When the user is verified as the validated user, the processor 10 further determines the corresponding authority level of the user according to the identification information of the user and the second relationship table 111.

The processor 10 further determines a number of dialing numbers corresponding to the authority level of the user according to the determined authority level and the first relationship table 110. As shown in FIG. 3A, in at least one embodiment, if the determined authority level of the user is the middle authority level, the processor 10 can determine the number of dialing numbers corresponding to the middle authority level is "1006-1020" according to the relationships recorded in the first relationship table 110 in FIG. 3A.

The processor 10 further selects one dialing number from the number of dialing numbers in response to a selection of the user. If the user selects the dialing number "1008" from the number of dialing numbers "1006-1020", the processor 10 selects the number "1008" accordingly.

The processor 10 further connects the electronic device 2 of the user to the corresponding virtual conference room 130 of the video conferencing management system 13 according to the selected dialing number. In at least one embodiment, because each dialing number corresponds to one of the virtual conference rooms 130, the processor 10 determines the virtual conference room 130 corresponding to the dialing number "1008", and connects the electronic device 2 of the user to the virtual conference room 130 corresponding to the dialing number "1008" according to the dialing number "1008".

In one embodiment, the dialing numbers can be physical or virtual telephone numbers, the processor 10 connects the electronic device 2 of the user to the corresponding virtual conference room 130 of the video conferencing management system 13 by dialing the selected dialing number. In another embodiment, the dialing numbers can be network address, such as internet protocol (IP) address, the processor 10 connects the electronic device 2 of the user to the corresponding virtual conference room 130 of the video conferencing management system 13 by connecting the electronic device 2 of the user to the selected dialing number.

In at least one embodiment, the number of virtual conference rooms 130 are divided into high-capacity conference rooms, middle-capacity conference rooms, and low-capacity conference rooms. Each high-capacity conference room can accommodate fifty users, each middle-capacity conference room can accommodate thirty users, and each low-capacity conference room can accommodate ten users, in other embodiments, each high-capacity conference room, middle-capacity conference room, and low-capacity conference room also can accommodate different number of users. The electronic device 2 with high authority level can be connected to the high-capacity conference rooms, the electronic device 2 with middle authority level can be connected to the middle-capacity conference rooms, and the electronic device 2 with low authority level can only be connected to the low-capacity conference rooms.

In at least one embodiment, the electronic device 2 and the corresponding virtual conference room 130 of the video conferencing management system 13 is connected to each other by a Voice over Internet Protocol (VoIP) mode based on an Asymmetric Digital Subscriber Line (ADSL). In other embodiments, the electronic device 2 is connected to the corresponding virtual conference room 130 of the video conferencing management system 13 based on a Public Switched Telephone Network (PSTN).

The dialing numbers of the first relationship table 110 further includes a number of background dialing numbers, and each background dialing number corresponds to one of background video servers 3. In at least one embodiment, a number of background video servers 3 are used for providing data sharing and technical support with video type to the video conference. The processor 10 further selects one or more background dialing numbers in response to the selection of the user, and connects the one or more background video servers 3 corresponding to the selected background dialing numbers to the corresponding virtual conference room 130 according to the selected background dialing numbers.

In at least one embodiment, the video conference is a customer service conference about computer repair, the number of background video servers 3 can provide and share a monitor repair video, a processor repair video, or a motherboard repair video to the users joining in the video conference. In other embodiments, the video conference is a teaching conference, the background video servers 3 can provide a teaching video to the users joining in the video conference.

Figure 3B:
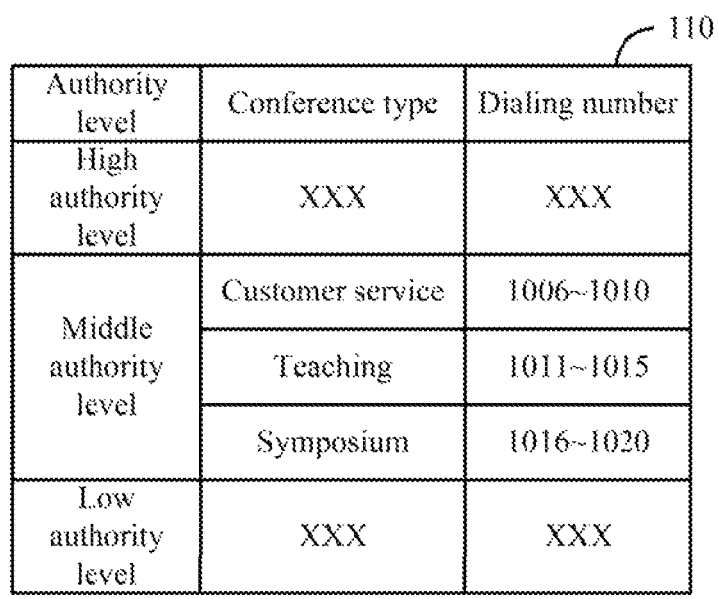

FIG. 3B illustrates the first relationship table 110 of a second embodiment. In the second embodiment, the first relationship table 110 further records a number of conference types and relationships among the number of authority levels, conference types, and dialing numbers. Each authority level corresponds to at least one conference type.

In at least one embodiment, the number of conference types can include customer service conference, teaching conference, symposium, and the like. The processor 10 further acquires the conference type which is selected by the user, determines a number of dialing numbers related to the conference type according to the determined authority level, the conference type, and the first relationship table 110, and selects one dialing number from the number of related dialing numbers in response to the selection of the user.

For example, as shown in FIG. 3B, if the determined authority level of the user is the middle authority level, the conference types corresponding to the middle authority level includes the customer service conference, the teaching conference, and the symposium. When the conference selected by the user is the customer service conference, the processor 10 can determine the number of dialing numbers are "1006-1010" according to the relationships recorded in the first relationship table 110 in FIG. 3B, and the processor 10 can select one dialing number from the number of dialing numbers "1006-1010" in response to the selection of the user.

FIG. 3C illustrates the first relationship table 110 of a third embodiment. In the third embodiment, the first relationship table 110 further records a number of time information corresponding to different or same authority levels and different or same conference types, and relationships among the number of authority levels, conference types, time information, and dialing numbers. Each time information corresponds to one of the dialing numbers.

In at least one embodiment, the number of the time information can include year information, month information, date information, time point information, time period information, or any combination thereof. The processor 10 further acquires the time information which is selected by the user, determines one corresponding dialing number according to the determined authority level, the conference type, the time information and the first relationship table 110, and connects the electronic device 2 of the user to the corresponding virtual conference room 130 according to the determined dialing number.

For example, as shown in FIG. 3C, if the determined authority level of the user is the middle authority level, the conference type selected by the user is the customer service conference, the time information is "2014/10/20, 14:00-15:00", the processor 10 can determine the dialing number is "1008" according to the relationships recorded in the first relationship table 110 in FIG. 3C.

Furthermore, the processor 10 verifies a newly added background video sever 3 when the newly added background video sever requests to log in the web portal 14, each newly added background video server 3 corresponds to a new background dialing number. When the newly added background video server 3 passes the verification, the processor 10 updates the new background dialing number corresponding to the newly added background video server 3 in the first relationship table 110. The processor 10 detects whether the newly added background video server 3 logs out from the web portal 14, and if the newly added background video server 3 logs out from web portal 14, deletes the corresponding updated background dialing number from the first relationship table 110.

In at least one embodiment, when the user is the first user joining in the corresponding virtual conference room 130, the user is treated as the initiator of the video conference. The initiator can invite other users whose electronic device 2 has logged in the web portal 14 to join in the virtual conference room 130. The processor 10 can connect the electronic devices 2 of the invited users to the corresponding virtual conference room 130. In other embodiments, the initiator of the video conference also can send the dialing number corresponding to the virtual conference room 130 to other users whose electronic device 2 has logged in the web portal 14, and the users can join in the virtual conference room 130 by dialing the dialing number.

Figure 4:
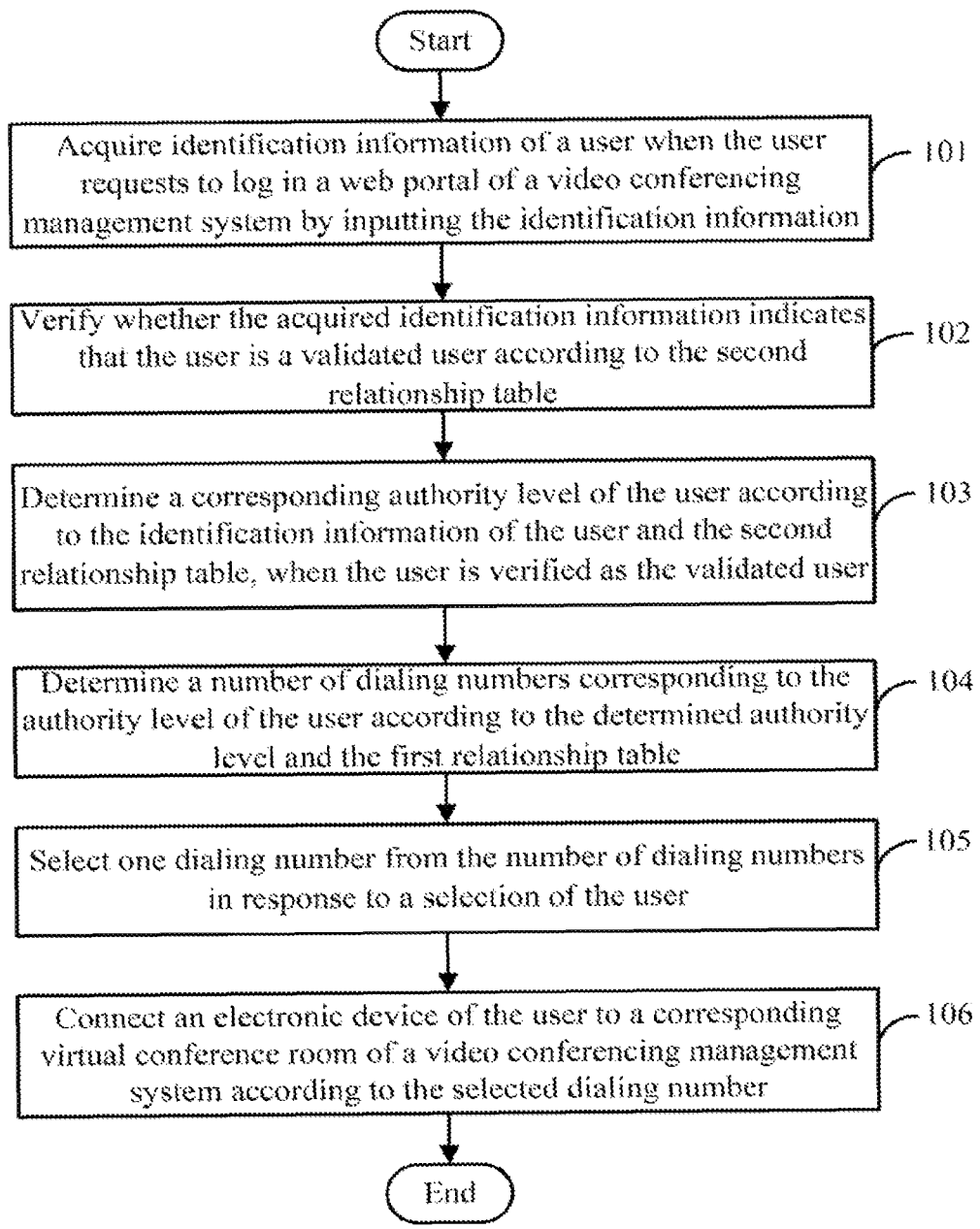
FIG. 4 illustrates a flowchart of a dialing method for video conferencing of one embodiment.

FIG. 4 illustrates a flowchart of a dialing method for a video conference. The method is provided by way of example, as there are a variety of ways to carry out the method. The method described below can be carried out using the configurations illustrated in FIG. 1, for example, and various elements of these figures are referenced in explaining the example method. Each block shown in FIG. 4 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 101.

At block 101, a processor acquires identification information of a user when the user requests to log in a web portal of a video conferencing management system by inputting the identification information.

At block 102, the processor verifies whether the acquired identification information indicates that the user is a validated user according to the second relationship table.

At block 103, when the user is verified as the validated user, the processor further determines a corresponding authority level of the user according to the identification information of the user and the second relationship table.

At block 104, the processor further determines a number of dialing numbers corresponding to the authority level of the user according to the determined authority level and the first relationship table.

At block 105, the processor further selects one dialing number from the number of dialing numbers in response to a selection of the user.

At block 106, the processor further connects an electronic device of the user to a corresponding virtual conference room of the video conferencing management system according to the selected dialing number.

The method can further include: the processor selects one or more background dialing numbers in response to the selection of the user, and connects the background video servers corresponding to the selected background dialing numbers to the corresponding virtual conference room by dialing the selected background dialing numbers.

The method can further include: the processor acquires a conference type which is selected by the user;

the processor determines a number of dialing numbers related to the conference type according to the determined authority level, the conference type, and the first relationship table, and the processor selects one dialing number from the number of related dialing numbers in response to the selection of the user.

The method can further include: the processor acquires time information which is selected by the user;

the processor determines one corresponding dialing number according to the determined authority level, the conference type, the time information and the first relationship table, and the processor connects the electronic device of the user to the corresponding virtual conference room according to the determined dialing number.

The method can further include: the processor verifies a newly added background video sever when the newly added background video sever requests to log in the web portal;

when the newly added background video server passes the verification, the processor updates the background dialing number corresponding to the newly added background video server in the first relationship table; and the processor detects whether the newly added background video server logs out from the web portal;

if the newly added background video server logs out from the web portal, the processor deletes the corresponding updated background dialing number from the first relationship table.

In one embodiment, the dialing numbers can be physical or virtual telephone numbers, the block 106 can include: the processor connects the electronic device of the user to the corresponding virtual conference room of the video conferencing management system by dialing the selected dialing number. In another embodiment, the dialing numbers can be network address, the block 106 can include: the processor connects the electronic device of the user to the corresponding virtual conference room of the video conferencing management system by connecting the electronic device of the user to the selected dialing number.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A dialing device for video conferencing comprising:
a network port configured to connect to a plurality of electronic devices;
a storage device configured to store one or more programs, a first relationship table, and a second relationship table, wherein the first relationship table records relationships between a plurality of authority levels and a plurality of dialing numbers, and the second relationship table records identification information and the authority level of each user;
at least one processor configured to execute the one or more programs, when the one or more programs being executed by the at least one processor, the one or more programs cause the at least one processor to:
acquire the identification information of a user when the user requests to log in a web portal of a video conferencing management system by inputting the identification information;
verify whether the acquired identification information indicates that the user is a validated user according to the second relationship table;
determine, when the user is verified as the validated user, the corresponding authority level of the user according to the identification information of the user and the second relationship table;
determine a plurality of dialing numbers corresponding to the authority level of the user according to the determined authority level and the first relationship table;
select one dialing number from the plurality of dialing numbers in response to a selection of the user; and
connect the electronic device of the user to a corresponding virtual conference room of the video conferencing management system according to the selected dialing number.

2. The dialing device according to claim 1, wherein the dialing numbers of the first relationship table further comprise a plurality of background dialing numbers, each background dialing number corresponds to one of the background video servers.

3. The dialing device according to claim 2, wherein the at least one processor is further caused to:
select one or more background dialing numbers from the plurality of background dialing numbers in response to the selection of the user; and
connect the one or more background video servers corresponding to the selected background dialing numbers to the corresponding virtual conference room according to the selected background dialing numbers.

4. The dialing device according to claim 2, wherein the at least one processor is further caused to:
verify a newly added background video sever when the newly added background video sever requests to log in the web portal, with each newly added background video server corresponding to a new background dialing number;
when the newly added background video server passes the verification, update the new background dialing number corresponding to the newly added background video server in the first relationship table;
detect whether the newly added background video server logs out from the web portal; and
if the newly added background video server logs out from the web portal, delete the corresponding updated background dialing number from the first relationship table.

5. The dialing device according to claim 1, wherein the first relationship table further records a plurality of conference types and relationships among the plurality of authority levels, conference types, and dialing numbers, the at least one processor is further caused to:
acquire the conference type which is selected by the user;
determine a plurality of dialing numbers related to the conference type according to the determined authority level, the conference type, and the first relationship table; and
select one dialing number from the plurality of related dialing numbers in response to the selection of the user.

6. The dialing device according to claim 5, wherein the first relationship table further records a plurality of time information corresponding to different or same authority levels and different or same conference types, and relationships among the plurality of authority levels, conference types, time information, and dialing numbers, the at least one processor is further caused to:
acquire the time information which is selected by the user;
determine one corresponding dialing number according to the determined authority level, the conference type, the time information and the first relationship table; and
connect the electronic device of the user to the corresponding virtual conference room according to the determined dialing number.

7. The dialing device according to claim 1, wherein the dialing numbers are physical or virtual telephone numbers, the processor connects the electronic device of the user to the corresponding virtual conference room of the video conferencing management system by dialing the selected dialing number.

8. The dialing device according to claim 1, wherein the dialing numbers are network address, the processor connects the electronic device of the user to the corresponding virtual conference room of the video conferencing management system by connecting the electronic device of the user to the selected dialing number.

9. A dialing method for video conferencing being executed by at least one process of a dialing device, the method comprising:

acquiring the identification information of a user when the user requests to log in a web portal of a video conferencing management system by inputting the identification information;

verifying whether the acquired identification information indicates that the user is a validated user according to a second relationship table;

determining, when the user is verified as the validated user, a corresponding authority level of the user according to the identification information of the user and the second relationship table;

determining a plurality of dialing numbers corresponding to the authority level of the user according to the determined authority level and a first relationship table;

selecting one dialing number from the plurality of dialing numbers in response to a selection of the user; and connecting an electronic device of the user to a corresponding virtual conference room of the video conferencing management system according to the selected dialing number.

10. The dialing method according to claim 9, further comprising:

selecting one or more background dialing numbers from the plurality of background dialing numbers in response to the selection of the user; and connecting the one or more background video servers corresponding to the selected background dialing numbers to the corresponding virtual conference room according to the selected background dialing numbers.

11. The dialing method according to claim 10, further comprising:

verifying a newly added background video sever when the newly added background video sever requests to log in the web portal, with each newly added background video server corresponding to a new background dialing number;

when the newly added background video server passes the verification, updating the new background dialing number corresponding to the newly added background video server in the first relationship table;

detecting whether the newly added background video server logs out from the web portal; and if the newly added background video server logs out from web portal, deleting the corresponding updated background dialing number from the first relationship table.

12. The dialing method according to claim 9, further comprising:

acquiring the conference type which is selected by the user;

determining a plurality of dialing numbers related to the conference type according to the determined authority level, the conference type, and the first relationship table; and selecting one dialing number from the plurality of related dialing numbers in response to the selection of the user.

13. The dialing method according to claim 12, further comprising:

acquiring the time information which is selected by the user;

determining one corresponding dialing number according to the determined authority level, the conference type, the time information and the first relationship table; and connecting the electronic device of the user to the corresponding virtual conference room according to the determined dialing number.

14. The dialing method according to claim 9, wherein the dialing numbers are physical or virtual telephone numbers, the method comprises:

connecting the electronic device of the user to the corresponding virtual conference room of the video conferencing management system by dialing the selected dialing number.

15. The dialing method according to claim 9, wherein the dialing numbers are network address, the method comprises:

connecting the electronic device of the user to the corresponding virtual conference room of the video conferencing management system by connecting the electronic device of the user to the selected dialing number.

* * * * *